United States Patent

Funke et al.

[11] Patent Number: 6,015,169
[45] Date of Patent: Jan. 18, 2000

[54] CONNECTOR FOR CONCRETE PIPES

[75] Inventors: Hans-Gunter Funke; Norbert Funke, both of Sendenhorst, Germany

[73] Assignee: Kunst-Stoffrohren Sedenhorst GmbH, Sedenhorst, Germany

[21] Appl. No.: 08/952,905

[22] PCT Filed: Mar. 11, 1997

[86] PCT No.: PCT/EP97/01232

§ 371 Date: Apr. 27, 1998

§ 102(e) Date: Apr. 27, 1998

[87] PCT Pub. No.: WO97/36128

PCT Pub. Date: Oct. 2, 1997

[30] Foreign Application Priority Data

| Mar. 25, 1996 | [DE] | Germany | 196 11 682 |
| Oct. 25, 1996 | [DE] | Germany | 196 44 357 |
| Feb. 7, 1997 | [DE] | Germany | 297 02 083 U |

[51] Int. Cl.[7] .................................................. F16L 41/08
[52] U.S. Cl. ................................. 285/136.1; 285/139.2; 285/351
[58] Field of Search ......................... 28/136.1, 139.2, 28/215, 216, 204, 351

[56] References Cited

U.S. PATENT DOCUMENTS

| 3,759,280 | 9/1973 | Swanson | 285/136.1 |
| 3,981,061 | 9/1976 | Jackson et al. | |
| 4,078,834 | 3/1978 | Hauff | 285/136.1 |
| 4,164,255 | 8/1979 | Binet et al. | 285/136.1 |
| 4,174,126 | 11/1979 | Hauff | 285/136.1 |
| 4,448,447 | 5/1984 | Funk et al. | 285/136.1 |

FOREIGN PATENT DOCUMENTS

| 332 815 | 10/1976 | Austria . |
| 479 172 | 4/1992 | European Pat. Off. . |
| 603 775 | 6/1994 | European Pat. Off. . |
| 34 46 360 | 7/1985 | Germany . |
| 295 14 881 U | 11/1995 | Germany . |
| 2951488 | 1/1996 | Germany . |
| 296 01 453 U | 1/1996 | Germany . |

*Primary Examiner*—Eric K. Nicholson
*Attorney, Agent, or Firm*—Pillsbury Madison & Sutro Intellectual Property Group

[57] ABSTRACT

This invention relates to a connecting pipe for a liquid-tight connection to a sewer pipe. The connecting pipe comprises a connecting-pipe body having at least two spaced apart circumferential sealing chambers, where one of the sealing chambers contains a first sealing element comprising a ring seal proximate an inside surface of the sewer pipe and facing an opening-wall surface of the branch opening. The ring seal comprises at least one sealing-lip ring extending over an outer contour of this sealing chamber to contact the opening-wall surface of the branch opening. Another sealing chamber contains a second sealing element comprising a flexible filler proximate an outer surface of the sewer pipe and facing the opening-wall surface of the branch opening, such that a slot chamber extending from this sealing chamber to the opening-wall surface of the branch opening is sealingly bridged. The connecting pipe comprises a spacing ring having a bearing flange compatible with an outside pipe surface of the sewer pipe, wherein the spacing ring is a positioning ring fastened to the connecting-pipe body by fastening means in such a manner that when the connecting-pipe body is inserted into the branch opening, the first and second sealing elements are positioned opposite the opening-wall surface of the branch opening.

17 Claims, 4 Drawing Sheets

CONNECTOR FOR CONCRETE PIPES

This application is the national phase of international application PCT/EP97/01232, filed Mar. 11, 1997 which designated the U.S.

The invention relates to a connecting pipe for a liquid-tight connection to a sewer pipe in whose wall a branch opening is placed, which pipe comprises:

A connecting-pipe body in which are least two circumferential sealing chambers are arranged which are spaced from one another and into which a sealing element can be placed, and A spacing ring whose bearing flange is compatible with the outer pipe surface of the sewer pipe.

DE-U-29 601 453 teaches a connecting pipe for a feed pipe. The connecting pipe comprises an insertion part provided with circumferential rubber seals. After the placing of a branch opening in the sewer pipe the insertion part is inserted into the branch opening. The ends of the rubber seals which ends press on the inner wall of the sewer pipe consisting of concrete then assume the sealing function.

It is disadvantageous that a sealing and holding behavior of the connecting pipe in the branch opening is a function of the material elasticity of the rubber seals. The extreme roughness of the concrete can reduce the seal. Gases developing in the sewer pipe can expel the insertion part like a cork out of a champagne bottle.

A connection of a connecting pipe to a sewer pipe is known from DE-U-29 514 881. A circumferential sealing chamber is arranged at the end of the connecting pipe into which chamber a ring seal is placed. The ring seal has a sealing lip extending over the sealing chamber. The connecting pipe is then completely thrust through a branch opening placed in the sewer pipe with the seal designed in this manner in front. The tight-closing connection is established by raising up the connecting pipe. A tension ring under which a position ring is placed assures a tightening of the sealing ring. A groove placed in the connecting pipe into which groove a web of the positioning ring engages assures that the positioning ring rests in the proper position on the surface of the sewer pipe.

A connection of a connecting pipe to a sewer pipe is known from DE-A-3 446 360. An opening is placed in the sewer pipe. In order to assure the connection between the sewer pipe and the connecting pipe the connecting pipe comprises an insertion piece whose e nd intended to be inserted into the opening has the form of an outwardly directed collar with an outside diameter essentially equal to the diameter of the opening. The other end, intended to receive the branch line, has an external threading. The connecting pipe is provided with an insertion piece whose outside diameter is less than the outside diameter of the collar and of the end provided with the threading. In addition, the connecting pipe comprises a tension ring. An L-shaped sealing ring is placed into a developing sealing chamber which sealing ring is then tightened with the tension ring. A disadvantage is the fact that the sealing connection can only be produced by a tightening of the individual parts of the outer tube. The sealing ring rests hereby on the outer surface of the sewer pipe and extends into the inside of the opening.

AT-C 332 815 teaches a sealing ring for a connection between conduit shafts and pipes vertical to the latter.

A disadvantage is the fact that the sealing ring rust correspond to the dimensions of the opening of the conduit shaft since it rests on the outer and the inner surface of the sewer pipe while jacketing the opening at the same time. As a result of this special shape the sealing ring must assume the function of the inflow pipe at the same time.

EP-A-0 603 775 teaches a method of tightly connecting a sewer pipe to a connecting pipe and teaches a connecting pipe which can be tightened to this end. The connecting pipe comprises a sealing holding chamber on one end into which chamber a ring seal is placed. A branch opening is placed in the sewer pipe into which opening the connecting pipe is inserted with the sealing chamber in front until a turned-in sealing lip is freed. The connecting pipe is sealingly held in the branch opening by a raising up and subsequent tightening with a tension ring. Elevations of pressure which occur in the interior of the sewer pipe are not able to press the connecting pipe tightened in this manner out of the conduit opening. In addition, plastic foam is introduced via an introduction, guidance and distribution system which foam fills up a space formed by the connecting pipe and the opening and farms a foam-sealing and holding element. This element protects only the inner wall of the opening and the reinforcement exposed in it and seals the connecting pipe from the outside and only additionally holds it fixed in the opening.

EP-A-0 479 172 teaches an insertion sleeve; connection comprising a sleeve, a pointed end of a pipe as insertion part and an activatable sealing ring of an elastomeric material. The sealing ring arranged in the groove of the pointed end is activated in such a manner by forcing in air or a plastic or permanently elastic medium that it bridges a residual slot between the sleeve and the pointed end and thus seals. A lip-shaped pre-sealing ring is located in front of the sealing ring which pre-sealing ring receives shearing forces which can result in an overloading of the seal.

This solution can only be used for an insertion sleeve connection at a very high price. Thus, the sealing ring must have a base part corresponding to the groove width, have two side flanks touching the groove surfaces and have a deformable front part, which front part must be designed in such a manner in the non-activated state that the two curved edge parts are at the same height as the pointed end surface whereas the curved inner part is located inside the groove.

The invention has the problem, starting from a connecting pipe of the known type initially cited, of improving the insertion into and especially the holding fast of the connecting pipe in the branch opening of the sewer pipe.

This problem is solved in accordance with the invention by the features of claim 1.

The advantages achieved are in particular that the connecting pipe can be inserted like a cork into the prepared branch opening of the sewer pipe. The positioning ring fixed to the connecting pipe, the bearing flange of which ring is compatible with the outer pipe surface of the sewer pipe, assures that the body of the connecting pipe is set on in the proper position. As a result thereof the circumferential sealing-lip ring of the ring seal, which lies in the sealing chamber following the curvature of the wall of the sewer pipe, comes to lie with the proper fit and in the proper position opposite the inner surface of the branch opening. The beveled sealing-lip ring facilitates the insertion into the branch opening. Once the connecting pipe has been thrust into the branch opening the sealing-lip ring offers a first active resistance to a withdrawal. In addition, its elasticity assures that it rests in a liquid-tight manner. Moreover, the penetration of the filler is facilitated.

The flexible filler is then used. This filler does not have to be pre-formed extra. Rather, the sealing chamber needs only to be filled with a filler material in such a manner after the insertion of the connecting pipe that the slot chamber between the connecting pipe and the wall of the branch opening is bridged. It is in particular possible by varying the filling pressure to close extant hollow air spaces in the concrete in a sealing manner.

The body of the connecting pipe can comprise several circumferential sealing chambers spaced from each other. The flexible filler can be filled into at least the uppermost sealing chamber and a ring seal with at least one sealing-lip ring extending over the sealing chamber can be inserted into the lowest sealing chamber.

A flexible two-component polyurethane resin which thickens immediately and which is free of external softeners and other volatile compounds can be used as filler. This composition assures that such a filler imparts the same elasticity properties as air to the seal but not its volatility. As a result of the fact that the filler fills the slot chamber in a fixed amount any material expansions of the concrete and also of the material of the connecting pipe used which occur can be compensated without adversely affecting the sealing behavior.

The ring seal can consist of a sealing body on which the sealing-lip ring has been formed. One or two sealing-lip rings can be arranged on the ring seal. If two sealing-lip rings are formed on, a circumferential recess which is partially circular in cross section can be placed in the sealing body between them. This special fashioning brings it about that the sealing ring exhibits a soft insertion procedure and elevated properties of sealing and of clinging fast.

The sealing chambers can be placed around the connecting pipe in a contour which corresponds to the following formula of development:

$$y = \frac{1}{2}\left(D \cdot \sqrt{D^2 - (d \cdot \sin\alpha)^2}\right)$$

and or $$y = \pi \cdot d$$

with

α from 0 to 360° circumferential angle

D inside diameter of a sewer pipe d inside diameter of a connecting pipe.

The simplest contour represents a circumferential circle around the connecting pipe. Such a contour can be used when the sewer pipe has a relatively large thickness.

The meandering contour according to formula $$y = \frac{1}{2}\left(D \cdot \sqrt{D^2 - (d \cdot \sin\alpha)^2}\right)$$

is more favorable than the simple circular contour. The advantage of this contour is based on the fact that a projecting of the connecting pipe into the inner space of the sewer pipe is avoided.

The wall curvature is thus ultimately determined by the shaping of the particular sewer pipe. If a sewer pipe with a round cross section is used, the wall curvature corresponds to the pipe diameter of the sewer pipe. The wall curvature can be selected in such a manner thereby that it can be used for sewer pipes with different pipe diameters. Thus, the wall curvature for a pipe with a diameter of 50 cm can be selected in such a manner that pipes with a nominal diameter of 40 to 60 cm can also be encompassed at the same time.

In order to be able to connect a branch pipe to a connecting pipe in a tightly sealing manner an annular connecting ring chamber is placed on the inner surface of the body of the connecting pipe into which annular chamber a connecting ring seal is placed.

In addition, a limiting web which is at least partially circumferential can be arranged on the inner surface of the body of the connecting pipe. The limiting web constitutes an assembly aid for the branch pipe.

The body of the connecting pipe can merge on one end into an at least partially circumferential outer ring under which the positioning ring is arranged. The outer ring constitutes, with a longitudinally running web on the body of the connecting pipe on which a guide recess of the positioning ring runs, the fixing elements for fixing and positioning the positioning ring and the body of the connecting pipe relative to each other.

It is advantageous if such a body of a connecting pipe is manufactured in one piece with the circumferential outer ring from plastic, especially from polyvinyl chloride (PVC). Other plastics, e.g. PE, can also be used. The positioning ring can also be manufactured from plastic; however, a metal, especially a surface-finished metal, can also be used. Moreover, the positioning ring can also be manufactured from concrete. These materials are especially well suited for the particular design associated with the function of this part to be realized.

The connecting body can be designed as a connecting-pipe solid body or as a double-walled body. The case of a connecting-pipe solid body concerns a pipe with a wall thickness of approximately 10 to 40 mm, preferably 20 mm.

The formation of the body of the connecting pipe as a connecting-pipe solid body has the advantage that the sealing chambers can be placed as two circumferential seal-receiving grooves which are spaced relative to one another and which follow the wall curvature. The connecting ring chamber can then be formed on the inner side as an annular connecting ring groove.

On the other hand, the ring seals and the connecting ring seal consist of a soft, elastic material. Rubber is used with advantage in this instance; however, plastic with an appropriate softness and hardness can also be used.

An exemplary embodiment of the invention is shown in the drawings and described in detail in the following.

Figure 1:
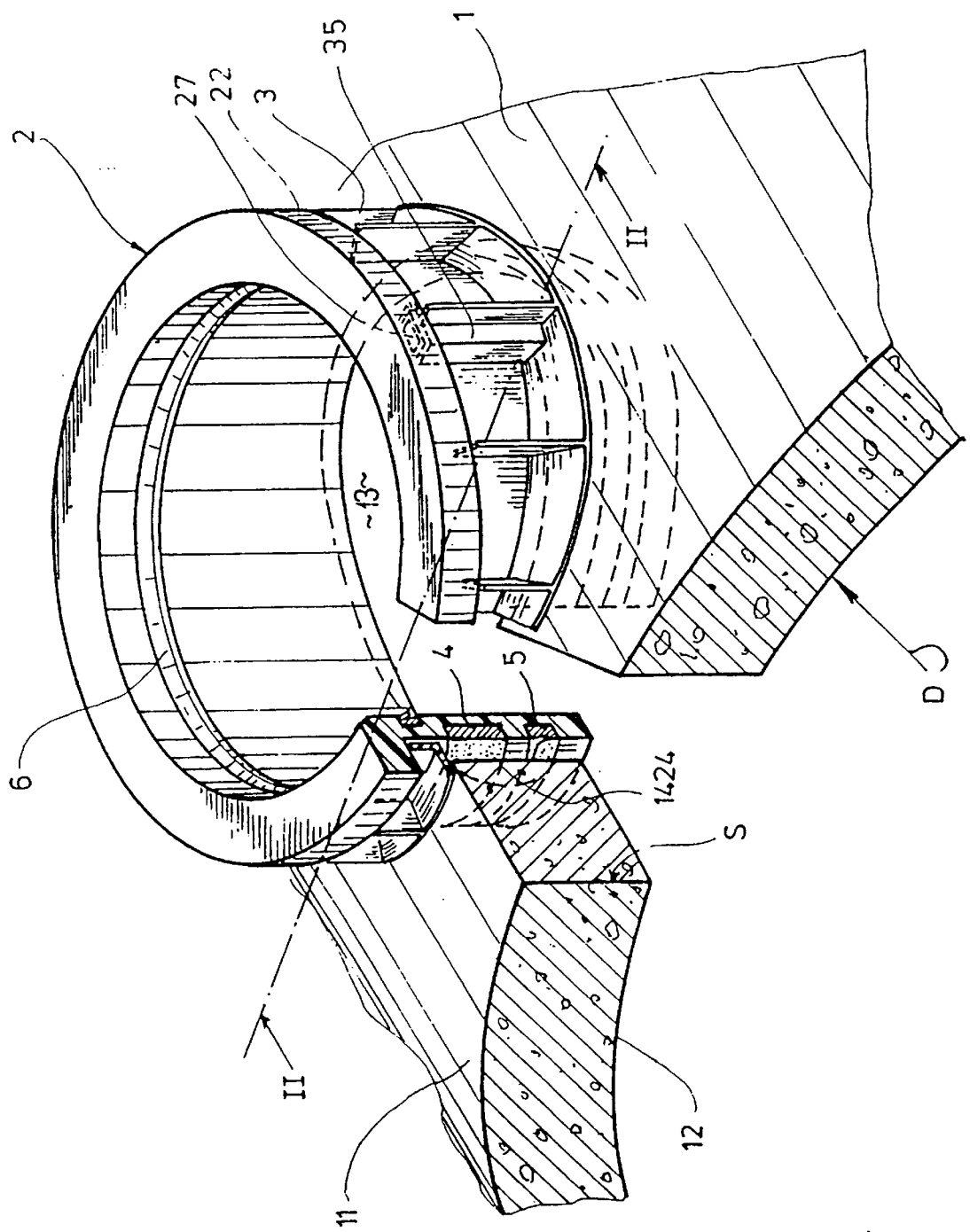
FIG. 1 shows a sealing connection using two-component polyurethane resin as sealing element between a sewer pipe and a connecting pipe in a perspective view in partial section.
Figure 2:
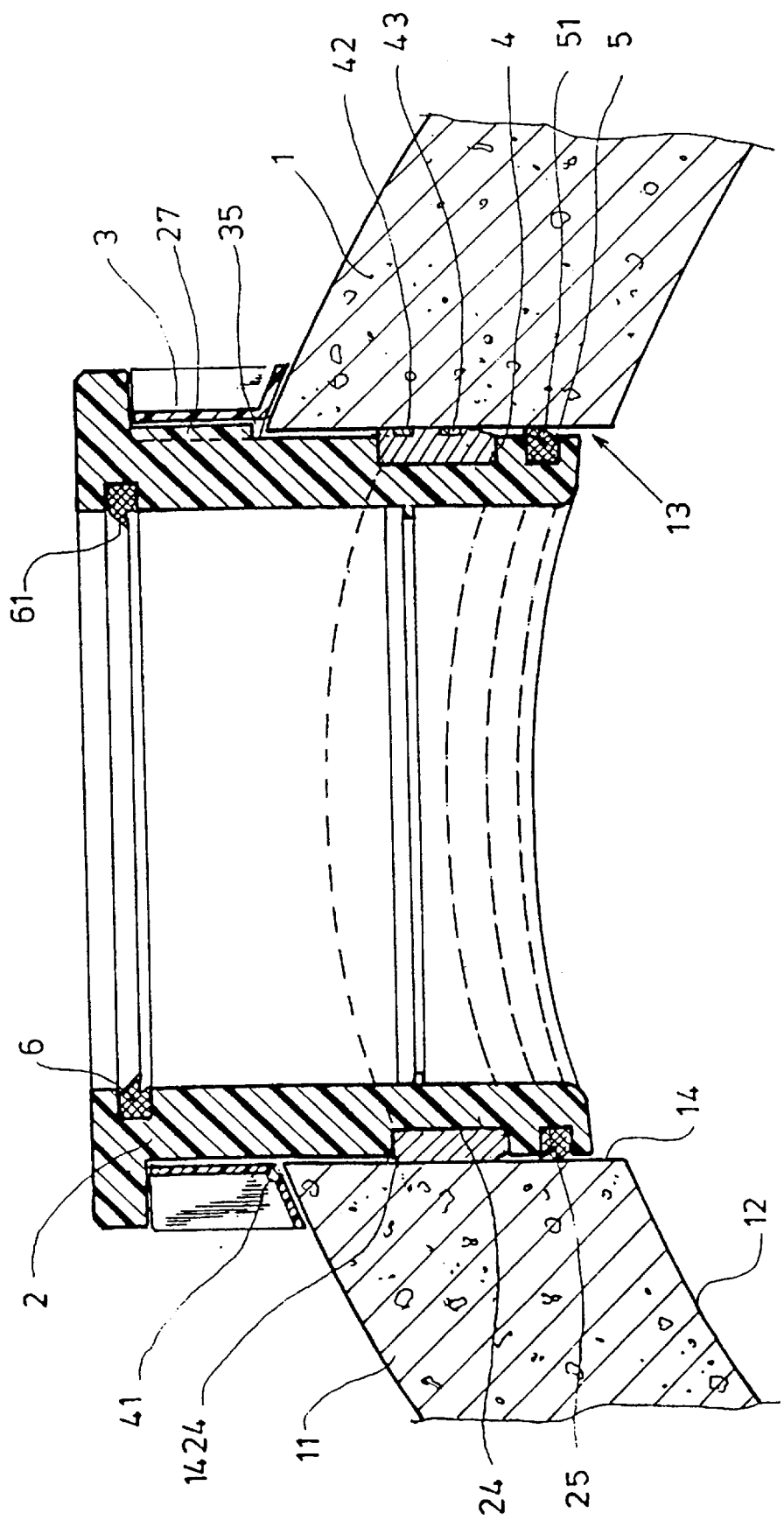
FIG. 2 shows a section through a connection according to FIG. 1 along line II—II.

A liquid-tight connection between a connecting pipe 2 (connection) and a sewer pipe 1 (concrete pipe) is shown in FIGS. 1 and 2.

According to FIG. 1 concrete pipe 1 has outer pipe surface 11 and inner pipe surface 12 which are spaced from one another by wall thickness S. Concrete pipe 1 has, like other sewer pipes too, different radii R as the following survey shows:

| Nominal width of concrete pipe 1 in mm | DN 300 | DN400 | DN500/600 | DN700/1200 |
|---|---|---|---|---|
| Dimension R in mm | 220 | 277 | 340 | 610 |

Wall thickness S, which is appropriately standardized, corresponds to pipe radii R and to inside diameters D.

Branch opening 13 is placed in such a concrete pipe 1. The placing of branch opening 13 takes place at the location at which a branch pipe is to be provided from a site to the main sewer train line. The diameter of branch opening 13 is determined by the dimensions of connecting pipe 2. Special boring devices assure that branch opening 13 has an essentially smooth opening wall surface 14. The material of use, concrete, is decisive for the surface and the roughness. If concrete pipe 1 is provided with an inliner (not shown), branch opening 13 also runs through the latter.

Figure 3:
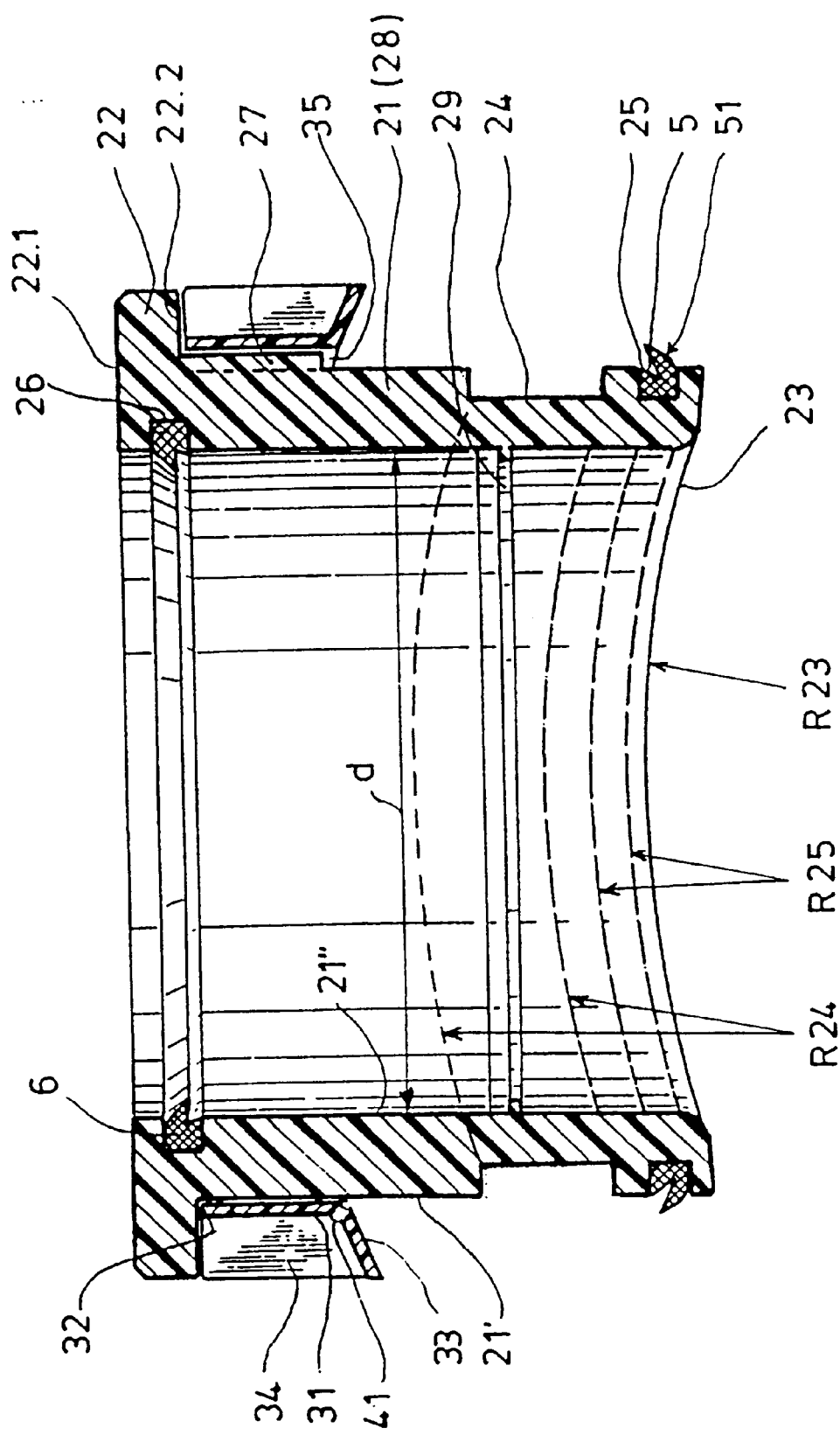
FIG. 3 shows a connecting pipe for a connection according to FIGS. 1 and 2 in a schematic sectional view.

Connecting pipe 2 (connection) for a connection to a sewer pipe 1 according to FIG. 1 consists of connecting-pipe body 21 (see also FIGS. 2, 3). Connecting-pipe body 21 can be designed as hollow- or connecting-pipe solid body 28. It is provided on one end with circumferential outer ring 22. Connecting-pipe body 21 and outer ring 22 adjacent to it are manufactured from plastic.

Connecting-pipe body 21 comprises limiting web 29 on its inner side 21" in the end opposite outer ring 22. Seal-receiving groove 24 and, underneath it and limited by an intermediate web, another seal-receiving groove 25 are located on its outer side 21'. Seal-receiving grooves 24, 25 are designed as following wall curvatures R24 and R25 of sewer pipe 1 with wall thickness S. Drainage curvature surface 23 of connecting-pipe body 28 has a wall curvature 23, running in a similar manner. If the hollow-cylindrical connecting-pipe body were cut open and unwound, it would have a contour corresponding to the formula $$y = \frac{1}{2}\left(D \cdot \sqrt{D^2 - (d \cdot \sin\alpha)^2}\right)$$

and or $$y = \pi \cdot d$$

with
  $\alpha$ from 0 to 360° circumferential angle
  D inside diameter of a sewer pipe
  d inside diameter of a connecting pipe
for the unwinding. Seal-receiving grooves 24, 25 and flow-off curvature surface 23, which follows wall curvature R23, thus have a sinusoidal configuration.

Ring seal 5, whose sealing body is followed by sealing-lip ring 51, is placed into seal-receiving groove 25 as a circumferential sealing ring.

Figure 4:
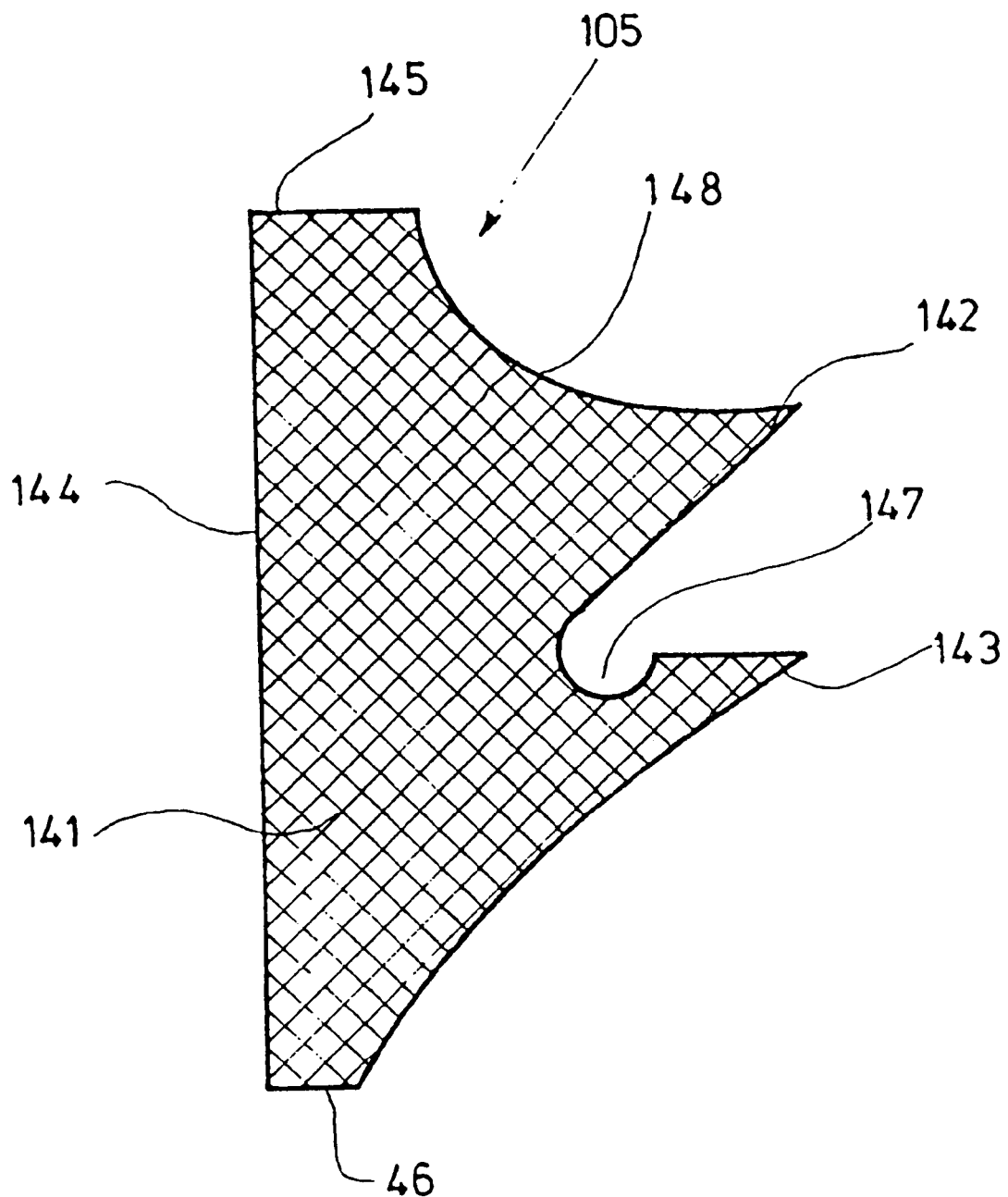
FIG. 4 shows another embodiment of a ring seal for a connecting pipe according to FIG. 3 in a schematic sectional view.

A ring seal 105, whose cross section can be seen in detail in FIG. 4, can also be placed into seal-receiving groove 25 as a circumferential sealing ring. Two sealing-lip rings 142, 143 are formed thereby on sealing body 141, which is limited by sealing-body inner surface 144 and mutually opposing outer body surfaces 145, 146. Sealing-lip ring 142 is formed like a snub turned up nose. A rounded part merges from body limiting surface 145 into a point which then merges in a bent fashion into a straight piece. In contrast thereto, sealing-lip ring 143 runs from body limiting outer surface 146 approximately parallel to the straight area of the sealing-lip ring likewise into a tip running upward which, however, is limited by an essentially plane surface. Recess 147 with a partially circular cross section is placed between sealing lip 142 and sealing lip 142 in sealing body 141. Recess 147 and round part 148 permit a corresponding deformation to sealing-lip rings 142, 143. The round areas assure that the inner tensional force of the material of which ring seal 105 is manufactured can develop completely. Just like ring seal 5, ring seal 105 is manufactured from an elastomer, especially a rubber. The interval between the two tips of sealing-lip rings 142 and 143 is proportional to the length of sealing body inner surface 144. The length of surface 144 is between 37 to 48 mm; correspondingly, the interval between ring tips 142 and 143 is 8.8 to 12 mm. The width of body limiting- outer surface 145, 146 is approximately 5 to 8 mm. Whatever special dirmensions the parts of ring seal 105 have is a function of the particular dimensions of connection 2. Of course, the indicated dimensions can be up to 90% below and up to 90% above them.

As FIGS. 2 and 3 show, web 27 is placed on outer surface 21' of connecting-pipe solid body 28. This web surrounds compatible guide recess 35 of positioning ring 3. Positioning ring 3 is fixed on its outer lower surface 22.2 with the aid of guide recess 35. The web can also be placed on the positioning ring and the guide recess on body 28. The opposite, annular outer ring surface 22.1 comes to rest in a protective manner in front of the individual parts of positioning ring 3. The latter consists of ring body 31 ending in bearing flange 33. The latter is adapted to arced outer pipe surface 11 of concrete pipe 1. Ring body 31 comprises support webs 34 spaced on its outer side which are connected to the bearing flange and extend to its end surface 32. This brings it about that the positioning ring can be well supported on all sides below lower surface 22.2 of the outer ring.

Connecting-pipe solid body 28 has annular, circumferential connecting ring groove 26 on its inner surface 21" into which connecting-pipe ring seal 6 is placed, whose sealing body merges into a sealing-lip ring. Annular limiting web 29 which extends at least partially through is arranged at the approximate height of seal-receiving groove 24. Limiting web 29 constitutes a ring formed on inner surface 21". For reasons of presentation it is reproduced somewhat curved.

The liquid-tight connection of connection 2 described in this manner to concrete pipe 1 is performed as follows:

Positioning ring 3 is thrust with the aid of its guide recess 35 over web 27 until below lower limiting surface 22.2 of outer ring 22. Web 27 is at the most as long as the height of ring body 31. In addition, ring seal 5 and connecting ring seal 6 are placed in provided receiving groove 25 as well as in connecting ring groove 26.

Connection 2 of the invention, which is prepared in this manner, is then thrust like a cork into prepared branch opening 13 of concrete pipe 1. During the insertion procedure sealing-lip rings 142, 143 and 51 fold back. This is facilitated in the case of ring seal 105 by round part 148 and partially circular recess 147. When sealing ring 5 is inserted the essentially triangular recess between sealing-lip ring 51 and the sealing body facilitates this. As a result of this one-sided deformation sealing-lip rings 142, 143 and 51 yield optimally to the thrust resistance. The roughness of the concrete in branch opening 13 can thus not adversely influence lip rings 142, 143 and inserted lip ring 51. It is important that the fixed positioning ring assures that the connection is inserted in the proper position. As a result of the fact that its bearing flange 33 is compatible with the outer pipe surface of the concrete pipe the (connection can only assume an end position in the inserted state. As a result of this very essential guide function sealing-lip rings 142 and 143 of ring seal 105 and/or the sealing-lip ring 51 of ring seal 5 press against opening-wall surface 14 of branch opening 13.

The pressing of lip rings 142, 143 and 51 on rough opening-wall surface 14 has the result that a high resistance is opposed to a withdrawal of connection 2 out of branch opening 13. The elasticity of the material, that is, of the rubber used, assures an areal contacting of the sealing-lip ring(s). As a result of the large-area contacting, lip ring 51 has a sealing action on all sides relative to opening-wall surface 14. Moreover, an additional clinging effect is induced.

Once connection 2 has been finally positioned, upper seal-receiving groove 24 is filled via fill opening 41 with flexible, two-component polyurethane resin 4. Polyurethane resin 4 fills up slot chamber 1424 extending between seal-receiving groove 24 to opening-wall surface 14 of the branch opening. Once enough polyurethane resin 4 has been introduced that slot chamber 1424 is full, the filling procedure can be terminated. Pressure nubs designated by 42, 43 can form during the filling procedure which act to increase holding and sealing.

It is essential that a flexible, immediately thickening two-component polyurethane resin 4 is used which is free of solvents, external softeners and other volatile compounds. It therefore has the elastic properties of air and the volume-stable properties of a cloth. This polyurethane resin 4 has the following technical data:

| Reaction data: | | |
| --- | --- | --- |
| Mixing viscosity at 15° C. | Pa·s | approx. 20 |
| Reaction time at 25° C. | min | 8–9 |
| Shore D-hardness | — | 54 |
| Substance data: | | |
| | Component A | Component B |
| Density at 15° C. kg/m³ | 990 | approx. 1170 |
| Flash point ° C. (DIN 51758) | 140 | 170 |
| Viscosity at 15° C. mPa·s | 520 ± 100 | 500 ± 100 |

Component A is a mixture of different polyether polyols and additives which reacts with component B to an elastic polyurethane. The mixture can in some instances foam up when intensively mixed with water. Water is displaced by the high viscosity in normal use without being taken up by the mixture. Component B is a prepolymer based on 4,4'-diphenylmethane diisocyanate with additives.

The polyol component is to be well agitated during the processing. The two components A and B are transported in a volumetric ratio of 1:1 via a two-component pump and hoses or 2-K cartridges or coaxial cartridges to a static mixer 5–10 mm in diameter, intimately mixed with each other there and discharged through fill opening 41 with a line into the interior of the splitting chamber.

Once the filling procedure of two-component polyurethane resin 4 has been concluded the fill line is drawn out of fill opening 41 and opening 41 can be closed off by a closing element in the shape of a stopper or valve. It is important that filled-in polyurethane resin 4 is pressed like a hose seal both sealing and holding between connection 2 and branch opening 13. In contrast to the connection only simply inserted for the moment a withdrawal of connection 2 from branch opening 13 is now no longer possible. In addition, polyurethane resin 4 assures that a very effective seal is established even relative to the rough concrete. The two-chamber ring seal principle used, in which a ring seal 5 and a flexible two-component polyurethane resin 4 lie over one another like a hose seal, produces a permanent seal between connecting pipe 2 and sewer pipe 1 in a simple and, in particular, effective manner.

Once connection pipe 2 has been connected to concrete pipe 1 in a liquid-tight fashion and in the manner described, the branch pipe, which is to establish the connection between an object and concrete pipe 1 serving as the main flow-off conduit, is inserted into connection 2. Circumferential limiting web 29 assures that the branch pipe is properly installed. During the insertion procedure of the branch pipe into connection 2 connecting ring seal 6 is placed in a sealing manner around the branch pipe, during which even its sealing-lip ring assumes stabilizing and sealing functions. Connecting-pipe body 21, which is designed as connecting-pipe solid body 28, is able, on account or its rigidity, to take both the transport as well as the rough conditions during insertion into concrete pipe 1. Moreover, its smooth and continuous outer surface 21' assures an additional stability in branch opening 13, in which it is partially supported on opening-wall surface 14. The likewise smooth and continuous inner surface 22" assures a clean guidance and, especially, a clean hold of the branch pipe. This eliminates tilts of the individual parts of the liquid-tight connection so that a branch which has once been produced with a connection in accordance with the invention is constantly tight. This optimal tightness is established and permanently assured in a simple manner by the two-chamber sealing principle used.

What is claimed is:

1. A connecting pipe for a liquid-tight connection to a sewer pipe having a branch opening, said connecting pipe comprising:

a connecting-pipe body having at least two spaced apart circumferential sealing chambers, wherein one of the sealing chambers contains a first sealing element comprising a ring seal proximate an inside surface of the sewer pipe and facing an opening-wall surface of the branch opening, and wherein the ring seal comprises at least one sealing-lip ring extending over an outer contour of said one sealing chamber to contact said opening-wall surface of the branch opening, and wherein another of said sealing chambers contains a second sealing element comprising a flexible filler proximate an outer surface of the sewer pipe and facing the opening-wall surface of the branch opening such that a slot chamber extending from said another sealing chamber to the opening-wall surface of the branch opening is scalingly bridged; and a spacing ring having a bearing flange compatible with an outside pipe surface of said sewer pipe, wherein the spacing ring is a positioning ring fastened to the connecting-pipe body by fastening means in such a manner that when the connecting-pipe body is inserted into the branch opening, the first and second sealing elements are positioned opposite the opening-wall surface of the branch opening.

2. The connecting pipe according to claim 1, wherein the filler is a flexible, immediately thickening two-component polyurethane resin which is free of external softeners and other volatile compounds.

3. The connecting pipe according to claim 1, wherein the ring seal consists of a sealing body on which the sealing-lip ring is formed.

4. The connecting pipe according to claim 3, wherein a first and a second sealing-lip ring are arranged on the sealing body spaced apart from one another.

5. The connecting pipe according to claim 4, wherein a circumferential recess partially circular in cross section is placed between the first and the second sealing-lip ring.

6. The connecting pipe according to claim 1, wherein the sealing chambers have a contoured course corresponding to at least one of the following formulas:

$$y = \frac{1}{2}\left(D \cdot \sqrt{D^2 - (d \cdot \sin\alpha)^2}\right)$$

and $$y = \pi \cdot d$$

wherein y represents the contoured course of the sealing chamber;

α represents a circumferential angle of 0 to 360°;

D represents an inside diameter of the sewer pipe; and d represents an inside diameter of the connecting pipe.

7. The connecting pipe according to claim 1, wherein the connecting-pipe body comprises at least one annular connecting ring groove on an inner surface of the connecting-pipe body into which ring groove a connecting-ring seal is placed.

8. The connecting pipe according to claim 7, wherein the ring seal and the connecting-ring seal comprises a soft elastic material.

9. The connecting pipe according to claim 8, wherein the soft elastic material includes rubber.

10. The connecting pipe according to claim 1, wherein an at least partially circumferential limiting web is arranged on an inner surface of the connecting pipe body.

11. The connecting pipe according to claim 1, wherein the connecting-pipe body merges on one end into an at least partially circumferential outer ring under which the spacing ring is arranged, and wherein the connecting pipe further comprises fixing elements, said fixing elements comprising the outer ring, a web placed on the connecting-pipe body, and a guide recess introduced into the spacing ring, said guide recess being compatible with the web.

12. The connecting pipe according to claim 11, wherein the connecting-pipe body is manufactured in one piece with the circumferential outer ring comprising a plastic material.

13. The connecting pipe according to claim 12, wherein the plastic material includes polyvinyl chloride.

14. The connecting pipe according to claim 1, wherein the connecting-pipe body is a solid body.

15. The connecting pipe according to claim 1, wherein the connecting-pipe body is a double-walled body.

16. The connecting pipe according to claim 1, wherein the spacing ring is comprised of a material selected from the group consisting of a plastic material, a metal material, and concrete.

17. The connecting pipe according to claim 16, wherein the metal material includes a surface-finished metal.

* * * * *